July 16, 1940.  A. G. FELDMAN  2,208,252
BABY CARRIAGE
Filed March 6, 1939  3 Sheets-Sheet 1
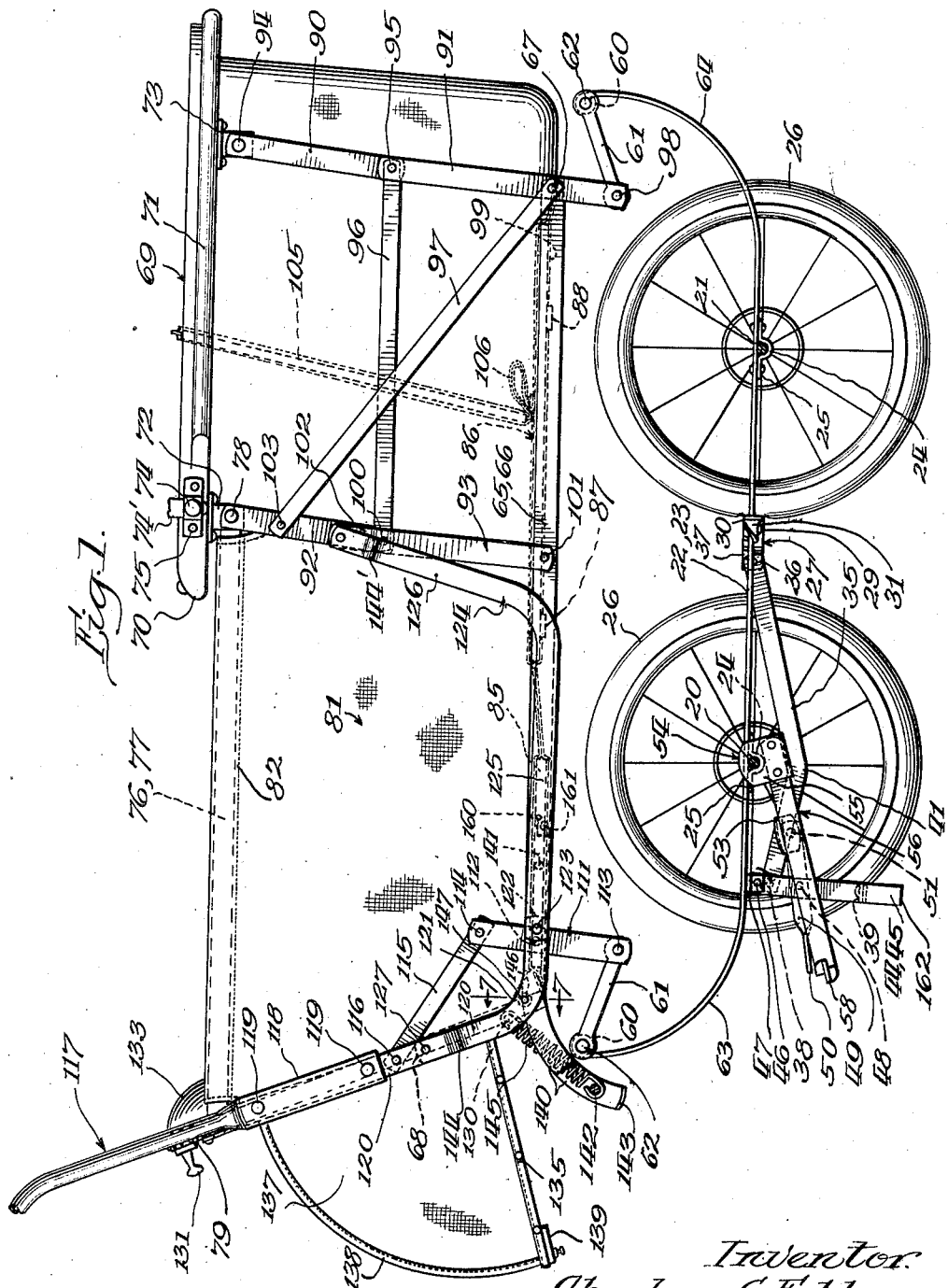
Inventor
Abraham G. Feldman
By
Williams, Bradbury, McCaleb & Hinkle
Attys.

July 16, 1940.　　A. G. FELDMAN　　2,208,252
BABY CARRIAGE
Filed March 6, 1939　　3 Sheets-Sheet 2
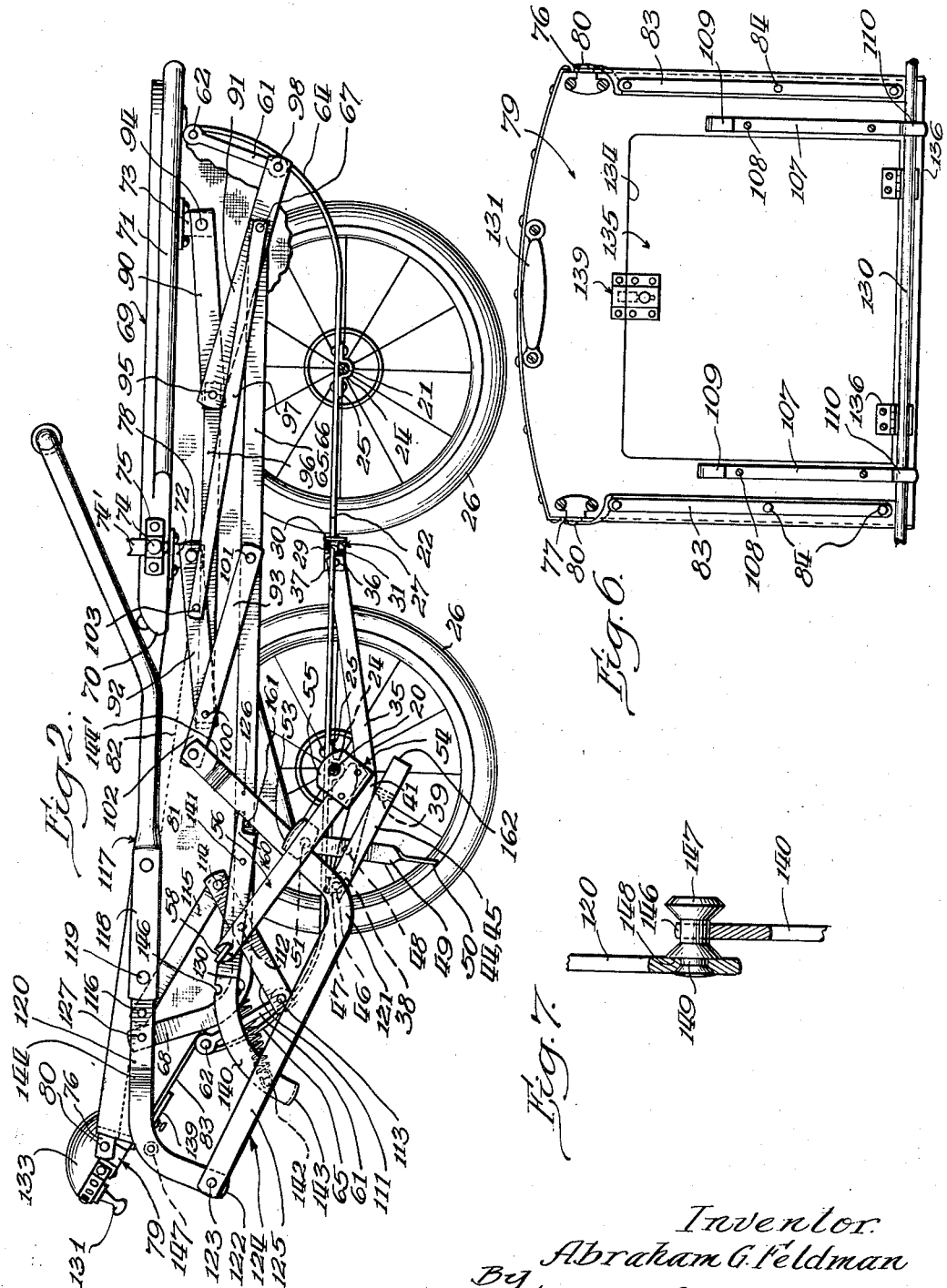
Inventor.
Abraham G. Feldman
By Williams, Bradbury,
McColet & Hinkle
Attys.

July 16, 1940.  A. G. FELDMAN  2,208,252
BABY CARRIAGE
Filed March 6, 1939  3 Sheets-Sheet 3
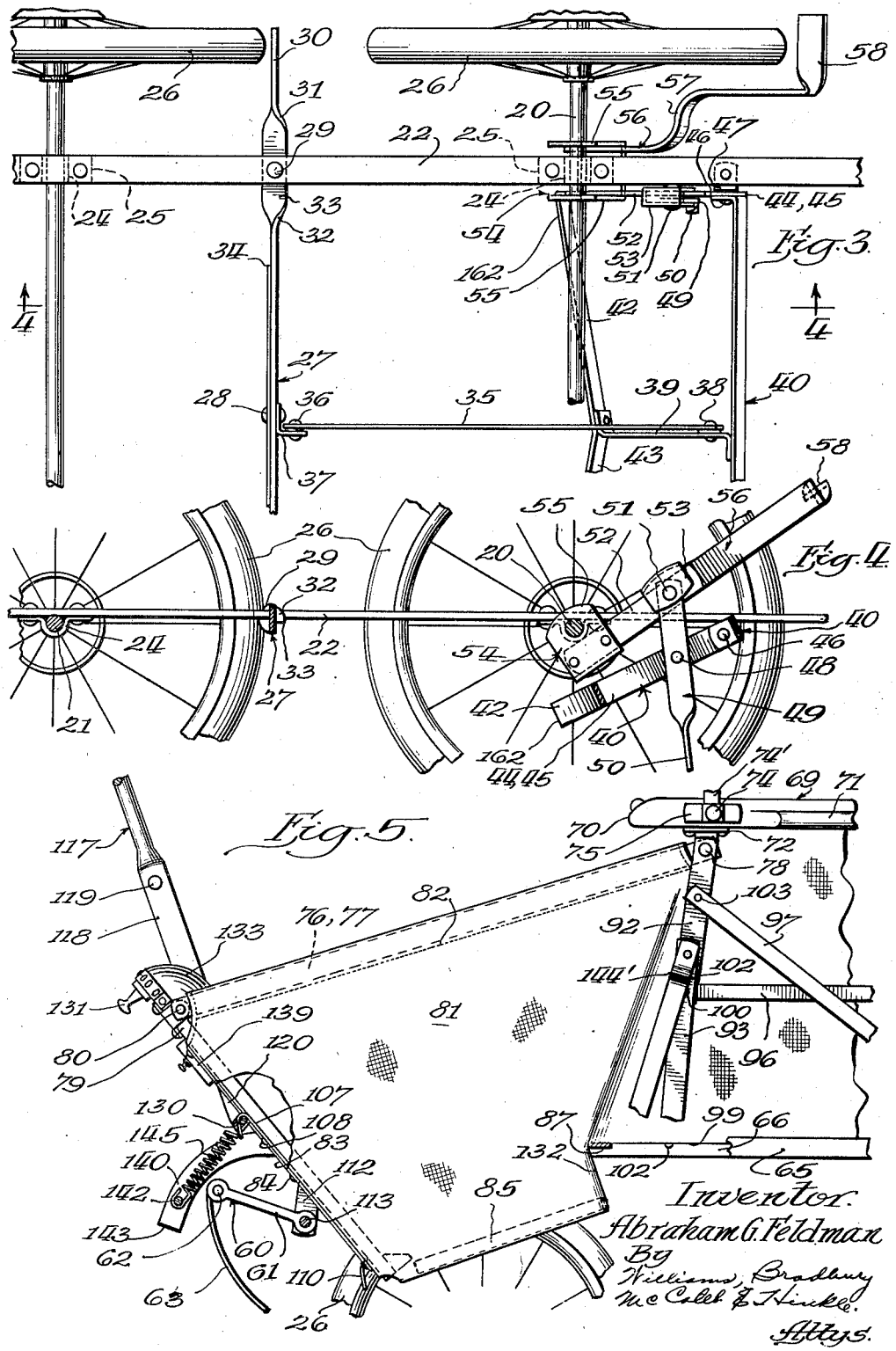

Patented July 16, 1940

2,208,252

UNITED STATES PATENT OFFICE 2,208,252

BABY CARRIAGE

Abraham G. Feldman, Chicago, Ill., assignor to Storkline Furniture Corporation, Chicago, Ill., a corporation of Illinois Application March 6, 1939, Serial No. 260,067

7 Claims. (Cl. 280—36)

The present invention relates to baby carriages, and is particularly concerned with baby carriages of the collapsible type.

One of the objects of the invention is the provision of an improved baby carriage of the collapsible type having a collapsible frame and provided with springs, in which the springs are not only utilized for springing the vehicle, but the springs are tensioned by the opening of the collapsible frame in such manner as to improve the spring characteristics of the vehicle and so that the collapsible frame may be latched in open position and urged to folded position by the action of the springs.

Another object of the invention is the provision of an improved collapsible baby carriage of the spring type, in which the collapsible frame is adapted to fold into the space within the springs, and due to its structure and arrangement it is adapted to fold into a minimum amount of space.

Another object of the invention is the provision of an improved baby carriage of the collapsible type, which is provided with an adjustable foot well adapted to be supported at a plurality of different elevations so that the foot support of the occupant may be at the same height as the seat of the vehicle, or it may be lowered in position to use the carriage as a stroller.

Another object of the invention is the provision of an improved carriage of the collapsible type having an adjustable foot panel, which may also be utilized as a back rest, and which is provided with means for extension of the foot space to accommodate occupants of larger size, or for the storage of merchandise.

Another object of the invention is the provision of an improved brake structure for collapsible baby carriages, which is adapted to simplify the construction of the lower wheel frame, and which is provided with a pair of convenient actuating levers, one for setting the brake, and the other for releasing the same, which levers are located rearwardly of the rear axle and toward the right of the vehicle in the position most readily accessible to the foot of the operator.

Another object of the invention is the provision of an improved baby carriage of the collapsible type, provided with an improved collapsible frame adapted to be actuated by the handle of the carriage, and an improved latching means for holding the frame in open position, which is so constructed that it is more conveniently operated by the foot of the operator.

Other objects and advantages of the invention will be apparent from the following description and the accompanying drawings, in which similar characters of reference indicate similar parts throughout the several views.

Referring to the drawings, of which there are three sheets,

Fig. 1 is a side elevational view of a baby carriage constructed according to the present invention, with the frame in open position;

Fig. 2 is a similar view, with the collapsible frame folded;

Fig. 3 is a fragmentary top plan view of the brake mechanism as it appears on a plane taken just below the fabric basket;

Fig. 4 is a fragmentary vertical sectional view, taken on the plane of the line 4—4 of Fig. 3, looking in the direction of the arrows;

Fig. 5 is a fragmentary elevational view, with the foot well in the alternative position which it assumes when it is desired to use the carriage as a stroller;

Fig. 6 is a rear elevational view of the rear panel of the basket, with the panel in its uppermost position;

Fig. 7 is a fragmentary view in partial section, taken on the plane of the line 7—7 of Fig. 1, looking in the direction of the arrows, showing the details of structure of the latch for holding the frame in open position.

The chassis of the baby carriage preferably comprises a pair of wheel axles 20, 21, which may consist of steel rods, and a pair of springs 22, 23, which may consist of flat steel bands. The axles 20, 21 may be secured to the springs 22, 23 by the U-shaped metal brackets 24, each of which has a pair of laterally projecting attaching flanges 25, riveted or otherwise secured to the springs 22, 23.

The brackets 24 have the central U-shaped portion of a size adapted to fit about the axles 20, 21, and of such length that the axle is fixedly clamped to the spring 22 or 23 by bracket 24. Axles 20 and 21 are spaced on springs 22, 23 by a distance slightly greater than the sum of the radii of the wheels 26, in order that the front and rear wheels may be spaced from each other, and in order to make room for the brake mechanism.

The axles 20, 21 are of greater length than the width of the vehicle, and project beyond the springs 22, 23 at each side, in order to provide sufficient length of axle to support a wheel at each end of the rods 20, 21.

Any suitable type of baby carriage wheel may be applied, the type shown comprising a suitable metal hub rotatably mounted on the axle 20, wire spokes, a metal rim, and a solid rubber tire. The ends of the axles 20, 21 are provided with transverse apertures for receiving cotter pins, which are used with washers for holding the wheels on the axles, and the cotter pins are covered by suitable stamped sheet metal shields.

In addition to the axles and springs, the chassis also preferably includes the brake beam 27, comprising a pair of steel bands which are riveted together at the center by rivet 28 and which are secured and pivotally mounted on the springs 22, 23 by rivets 29 as shown in Fig. 3.

In order to have the brake beam in proper position to flex and engage the wheels at its flat end portions 30, it is disposed in the vertical plane and has a pair of ninety degree twisted portions 31, 32 adjacent each spring, bringing the portion 3 into parallelism with the adjacent spring to be secured by rivet 29.

The bands of which the brake beam is made overlap each other at the middle, the end of each band extending to the point 34 adjacent the opposite side of the carriage so that the brake beam is doubled in thickness throughout the major portion of the beam, to give it greater stiffness.

Rivets 29 are preferably located on the springs 22, 23 so that the end portion 30 will be closely adjacent to the front wheels when the brake beam is straight, and so that the end portion 30 may be brought into tight engagement with the wheels when the brake beam is bent backwardly.

The brake beam 27 is adapted to be actuated by a mechanism which is shown in Figs. 1, 3, and 4. This mechanism includes a connecting rod 35, which may take the form of a flat band of steel pivotally secured by rivet 36 to one flange of an angle bracket 37, the other flange of which is carried by rivet 28 on the brake beam.

The opposite end of connecting rod or band 35 is pivotally secured by rivet 38 to the centrally located leg 39 of a pivotally mounted frame, indicated in its entirety by the numeral 40. In order to avoid interference between connecting rod 35 and axle 20 (Fig. 1), the connecting rod is bent diagonally upward at 41.

The frame 40 preferably comprises a pair of horizontal straps of metal 42, 43 joined by the three legs 44, 45, and 39, and the two end legs 44, 45 may comprise an integral part of transverse strap member 42. The end legs 44, 45 are secured to strap member 40 by having laterally turned portions which are riveted at 46 to the band 40.

The leg 39 may be made shorter than the legs 44, 45, and the side 42 may be caused to bend inward so as to form the frame with a pair of feet 162 at the right hand corners (Fig. 3) for the bottom of the frame in Fig. 1. These corners are spaced from the floor or roadway a slight distance, such as a quarter of an inch, when the frame is in the position of Fig. 1, so that the frame may serve as a guard against the upsetting of the vehicle by pivoting on the axle 20.

A pair of trunnions 46, one at each end of the frame, are riveted in the end frame members 44, 45 and pivotally mounted in angle brackets 47 carried by the springs 22 and 23.

Brackets 47 form bearings for the trunnions 46 and are riveted to the springs 22, 23 at a point rearwardly of the rear wheel axle 20. The frame 40 is thus pivotally mounted on the springs and adapted to swing downward to the position of Fig. 1, where it may also be utilized to supplement the brakes in holding the carriage in fixed position.

In order to perform this function, the legs 44, 45, and 39 need only to be slightly longer than the space beneath the springs 22, 23 and the roadway. The frame 40, however, is particularly adapted to be utilized in actuating the brake beam 27 and to take from the wheel axles 20, 21 the strain which would otherwise be placed upon them if they were used for mounting the brake actuating mechanism.

Where such brake actuating mechanism is mounted upon a relatively slender brake axle to effect a bending, there is a tendency to bow the axle and cock the wheels inward at one end. This tendency is augmented when the brake beam is relatively stiff.

In the present case the frame 40 is connected by a connecting rod 35 to the brake beam at the point 38 on leg 39, and the frame is adapted to be utilized to permit the location of foot pedals at any desired point; for example, in the preferred embodiment the frame 40 (Fig. 4) is pivotally connected by a rivet at 48 to a release lever 49 having a twisted extension 50 which serves as a foot pedal. The other end of the release lever 49 is pivotally connected by a rivet at 51 to a brake lever 52 (Fig. 3), which is pivotally mounted on the axle 20.

The brake lever 52 and the lever 49 are covered at the point of their pivotal connection, rivet 51, with a U-shaped stop member 53, which prevents them from passing beyond the position of Fig. 1.

Brake lever 52 is pivotally mounted on the axle 20 by means of a U-shaped stirrup 54, having an aperture in each of its legs for receiving the axle 20. The brake lever 52 is fixedly secured to the U-shaped member 54 by having its end riveted to one of the legs of the U-shaped member 54, having a pair of legs 55, and the brake lever 56 likewise has its end riveted to the opposite leg of the U-shaped member 54 by a pair of rivets. The legs of the U-shaped member 54 are disposed on opposite sides of the spring 22, and the yoke of the U-shaped member depends from the axle 20.

In effect, the brake lever 52 and the brake pedal 56 move as one lever, but the brake lever 56 is disposed outside the spring, whereas the brake lever 52 is disposed inside of the spring 22. The brake lever 56 may be provided with an offset at 57 and may extend rearwardly to a point behind the rear wheel, where it is turned laterally and twisted, to provide a horizontally extending end portion 58 for engagement with the foot.

The operation of the brake and its mechanism is as follows: When the parts are in the position of Fig. 4, the brake is off, but the brake may be applied by merely stepping upon the lateral extension 58 of the brake pedal 56, which will cause the brake pedal 56 to pivot in a clockwise direction on the axle 20. Due to the fixed connection 54, 55 between the brake pedal 56 and the lever 52, the lever 52 pivots simultaneously in the same direction, and the lever 49 moves the frame 40 downward, the frame 40 pivoting in a counterclockwise direction, as seen in Fig. 4. This downward movement of the frame 40 continues until it reaches the position of Fig. 1, where the lever 49 and brake pedal 52 have passed the position of alignment, and the release lever 49 extends slightly upward of the end of the brake pedal, as shown in Fig. 1.

During this motion of the frame 40 the point of pivotal connection 38 of the connecting rod 35 to the leg 39 moves in an arc, as shown by the arrow in Fig. 1, and it will be noted that this point of pivotal connection 38 is slightly below the axis of pivot 46 of the frame 40. Thus the pivotal movement of the frame 40 exercises a pull on the connecting rod 35, which effects a bending backward of the middle of the brake beam 27 and a bending forward of its ends 30.

The ends 30 or shoes of the brake beam engage the front wheels 26, and thus the brake is applied to the wheels. The brake beam 27 resists this movement of the frame 40 and resists the downward movement of the brake pedal 56 until the levers 52 and 49, parts of which act as a toggle, pass the dead center position; that is, the center of pivot (Fig. 1) passes to a point below the line of centers of the axle 20 and the axis 48.

Thereafter the pull on the connecting rod 35 (Fig. 1) which is exerted by the bent brake beam 27, and the compression of the rubber on the wheels against the brake shoe 30, tends to pull the toggle 49, 52 down farther in Fig. 1, but this is resisted by the U-shaped stop member 53, the yoke of which engages both of the levers 49, 52.

It should be noted that the U-shaped stop member 53 is pivotally mounted on the rivet 51. The brake may be released by merely pressing downward with the foot upon the brake release lever at the point 50. This causes a counter-clockwise movement of the brake lever 49 on the pivot 48 and tends to move the pivot 51 upward to brake the toggle.

As soon as 51 has passed the line of centers 48—20, the action of the brake beam moves the parts back to the position of Fig. 1.

The present brake mechanism has the advantage that it is positive, and without providing more than one brake beam it is possible to apply a braking force to the front wheels and also to utilize the frame member 40 to prevent tipping of the carriage.

The brake pedals in the present brake mechanism may be arranged at the side of the vehicle, where they are most conveniently operated by the foot, and they may be located rearwardly of the rear axle at a point adjacent the rear end of the basket, so that the operator can see the brake pedal and brake release pedal, and need not move backward of the carriage to peer under it when actuating these levers.

The springs 22, 23 are provided at each end with a substantially cylindrical curled portion 60 adapted to serve as a trunnion for connecting the chassis to the frame of the vehicle.

The springs form a part of the collapsible mechanism of the vehicle, since they are connected by means of a plurality of pivotally mounted shackles 61 to the collapsible frame. Each spring has a pair of shackles pivotally connected to it by a rivet 62 passing through the cylindrical bearing 60 and riveted at each end.

Each shackle may consist of a band of metal provided with an aperture at each end. When the carriage is in open position, as shown in Fig. 1, the shackles extend substantially horizontally or slightly below the horizontal position, and thus they are enabled to provide a floating or springing action because a downward push on the inner end of the shackles tends to draw the springs 22, 23 together.

The springs are curved upwardly at 63 and 64 at each end, and the curved end portion of the springs tends to be drawn inward by the shackles 61. At the same time, the weight of the vehicle on the springs tends to bend downward that portion of the springs which is between the curved parts 63, 64 and the axles 20, 21. That portion of the springs between the axles tends to be bowed upward by the weight of the vehicle.

When the carriage is folded, the shackles 61 are adapted to pivot downward into the curved portions of the springs, and the carriage is adapted to be collapsed into a smaller form because the folding frame occupies a space practically within the springs, as shown in Fig. 2.

The collapsible frame for the basket is identical in construction upon both sides of the carriage, and therefore only one need be described in detail.

At the bottom of the carriage on each side there is a longitudinally extending frame member comprising a strap of steel 65, 66, which extends from the front of the vehicle at the rivet or pivotal point 67 to the rear of the vehicle, where it curves upwardly and terminates at the point 68.

The upper frame of the basket may comprise a U-shaped wooden frame member 69, having two side portions and a back portion, which border the upper edge of the basket from the point 70 forwardly on that side and across the front end and backwardly to a similar point on the other side of the carriage.

The wooden frame member 69 may be substantially rectangular in cross section and provided with a rounded bead 71 projecting laterally therefrom, and it is adapted to serve as a support for the basket at this end of the carriage.

Fixedly secured on the lower side of the wooden frame 69 are a pair of angle pivot brackets 72, 73 on each side, by means of suitable wood screws. Any suitable type of baby carriage top may be mounted at the point 74 on the frame 69 by being pivoted on a lug 74', which is slidably mounted in a U-shaped bracket 75 and secured by the spring pressed plunger 74 engaging in a hole in the leg 74'.

The rabbeted formation above the rib 71 on the wooden frame 69 serves to support the baby carriage top when it is folded downward against the wooden frame 69 and outside of the rectangular part of the frame.

The upper frame of the carriage also comprises the forwardly extending steel straps 76, 77 on each side of the carriage and pivotally secured to the wooden frame 69 by the rivet 78 on angle bracket 72.

At the rear end of the carriage the frame members 76, 77 are pivotally secured to a wooden rear end panel 79 by means of a rivet 80 on each side of the carriage. The rear end panel 79, which will be described in greater detail hereinafter, serves as the end of the basket 81, and also as a frame member for the frame of the basket.

The basket for the carriage member may consist of a box-like fabric container of suitable fabric, such as an imitation leather, which is provided with the two sides, front end, and a bottom of such fabric. Adjacent the upper edge, around the frame 69, the basket 81 may be secured to the frame 69 on the inside of the frame, by suitable upholstery nails. At the forwardly extending frame members 76 and 77 the basket is provided with tubular stitched formation 82, through which the frame members 76, 77 extend to support this part of the fabric basket.

At the lower side of the wooden panel 79 the bottom of the basket 81 may be secured by suitable upholstery nails, and at the rear ends of the sides of the basket these sides may be secured to the rear panel 79 by being bent about the edges of the panel 79 and fastened to the outside with a pair of clamping metal strips 83 and suitable nails or screws 84.

Thus the basket 81 is adapted to hang from the upper frame 69, 76, 77 and 79, and the bottom of the basket may be provided with a plurality of cloth covered fiber boards 85, 86, for the purpose of preventing the basket from bulging downward in the middle. The board 86 may also be supported by a pair of transverse frame members, comprising straps of steel 87, 88, each strap having its end riveted in an aperture in the frame member 65 and 66 and extending transversely of these frame members, beneath the board 86.

The upper frame of the carriage in turn is carried by the lower frame 65, 66 of the carriage, by means of a plurality of folding links or struts 90, 91, 92, 93. The link 90 is pivotally mounted on the wooden upper frame 69 by the rivet 94 on the angle bracket 73. At its lower end the strut 90 is pivotally mounted by the rivet 95 to the strut 91 and the connecting link 96. The lower strut 91 is pivotally mounted intermediate its ends by means of rivet 67 to the lower frame member 65 or 66 on each side, and also pivotally connected to a diagonally extending connecting link 97.

The lower end of strut 91, which extends beyond the rivet 67, is fixedly secured by riveting to the end of a shackle rod 98, which extends through the pair of shackles 61 at the front end of the carriage, on each side, and is secured to a similar strut 91 on the other side of the carriage.

The shackles 61 are thus pivotally mounted on the shackle rod 98, and this end of the carriage is supported on the chassis, previously described.

The lengths of the link 90 and the link 91 between the pivots 94, 95 and 67 are proportioned in relation to the pivot of the basket so that the basket is supported with its bottom 99 just above the transverse frame members 87, 88.

The strut 92 on each side of the carriage is pivotally mounted to the angle bracket 72 by the rivet 76 at its upper end. At its lower end the strut 92 is pivotally connected to the strut 93 and to connecting link 96 by rivet 100. The strut 93 is pivotally connected at its lower end to the lower frame member 65 by the rivet 101, and the strut 93 projects upward beyond the rivet 100 to provide an extension 102, which is utilized in effecting a folding of the collapsible framework.

The diagonal connecting link 97 has its upper end pivotally connected to the strut 92 by a rivet 103 on each side of the carriage. The connecting link 96 assures the folding of the struts 90, 91, and 92, 93 in the same direction; that is, the pivots 95 and 100 must move together when the carriage is folded or opened.

The diagonal connecting link 97 being pivotally connected at 67 to the lower frame, determines the arc of movement of the strut 92 at the point 103, and thus causes the struts to fold downward to effect a vertical collapse of the basket 81.

The basket 81 may also be provided with a cloth covered wooden panel 105, secured at its lower end by a piece of fabric 106 to the bottom, and adapted to be secured at its upper end by straps and snappers to the wooden frame 69.

The panel 105 serves as a back for holding the occupant in sitting position, the panel 86 then serving as the seat; but, if desired, the length of the cloth strip 106 is such that the panel 105 may be doubled back over the panel 86 and laid flatly in the bottom of the basket 81.

The rear end panel 79 of the basket comprises a substantially rectangular wooden member, the upper end of which may be slightly convexly curved and, as previously stated, this wooden member is pivotally secured to the upper frame members 76, 77 at the points 80. The frame members 76, 77, being pivotally mounted at 78, some means must be provided for supporting the free end of these frame members and the wooden panel 79 on the frame of the vehicle.

This means comprises a pair of metal straps 107, one adjacent each of the lateral edges of the wooden panel 79, and extending vertically thereof. Straps 107 are secured to the outside of the end panel 79 by wood screws 108, and each strap is provided, as shown in Figs. 5 and 6, with a hook-shaped formation 109 at the top, and another one 110 at the bottom.

For this purpose the strap 107 is bent outward and downward at the top, and also outward and downward at the bottom, as shown in Fig. 5. The frame members 65, 66 are supported on the chassis at the rear end of the carriage by means of a lever 111 at each side, the levers being pivotally mounted on frame members 65, 66 by rivet 112.

The lever 111 has fixedly secured at its lower end a shackle rod 113 riveted into lever 111 at each end and passing through apertures in pairs of shackles 61 at each side of the carriage.

The pairs of shackles 61 are thus pivotally secured to the lower end of levers 111, which, as previously stated, are mounted on frame members 65, 66. This gives the rear end of the carriage a floating spring mounting similar to that described with respect to the front end of the carriage on the lower ends of the struts 91.

The lever 111 extends above its pivot 112 in Fig. 1, and at its upper end is pivotally connected by rivet 114 to a link 115. Link 115 has its opposite end pivotally connected by rivet 116 to one of the legs of handle 117. This structure is likewise the same on both sides of the carriage.

The handle 117 may comprise a tubular metal member of substantially U shape, the yoke of which is used for engagement with the hands, and the two legs of which extend downwardly at the rear end of the carriage.

The tubular metal member of which handle 117 is composed has its legs flattened at 118 and riveted at 119 to a steel strap 120 on each side, forming an extension of the handle.

The steel strap 120 extends downward and is provided with a curvature at 121, similar to the curvature of the upwardly extending end 68 of each frame member 65, 66. This strap extension 120 of the handle terminates at the point 122, where the end of this extension is pivotally connected by rivet 123 to a bent connecting rod 124, which permits the handle to control the folding of the collapsible mechanism.

The connecting rods 124 may consist of steel straps, having a horizontal part 125 extending along the bottom of the carriage, and an upwardly extending part 126 extending upward adjacent the strut 93. The purpose of this bent formation is to keep the side of the basket free of frame members at this point. The handle itself is pivotally mounted by means of a rivet 127 on each side of the carriage to the ends of the bottom frame members 65, 66.

It should be noted that rivet 127 is below rivet

116. When the handle 117 is pivoted in a clockwise direction, the link 115 moves toward the right in Fig. 1 and pivots the lever 111 in a clockwise direction. This is adapted to effect a downward folding of the shackles 61 at this end of the carriage when the carriage is collapsed.

The lower end of the handle extension 120 moves in a clockwise direction at the rivet 123 and draws the connecting rod 124 toward the left in Fig. 1, to effect a collapse of the struts 92, 93, and 90, 91.

The lower frame members 65, 66 are joined at the rear end of the carriage by a transversely extending rod 130, which is riveted into these frame members at each end to secure them in spaced relation to each other, and serve as a support for the rear end panel 79. Part of this rod 130 is seen in Fig. 6, and it will be observed that the end panel 79 may be supported by means of the lower hooks 110 on the rod 130.

If desired, the end panel 79 may be lifted by means of a suitable handle 131 at the top so that the hooks 110 are lifted off the rod 130, and thereafter the panel may be pivoted inward until the hooks 110 miss the rod 130 and permit it to drop until hooks 109 engage the rod 130, as shown in Fig. 5.

During this motion of the end panel, the upper frame members 76, 77 pivot at 78, and the bottom 99 of the basket moves downward, slack in the fabric being taken up between the wooden panels 85 and 86 to form what might be called a riser 132. Then the cloth covered panel 85 forms a step for supporting the feet while the occupant is in sitting position, upon the panel 86, which is used as the seat.

The rear end panel 79 may also be completely disengaged from the rod 130 and dropped into the space between the frame members 65, 66, preliminary to the collapsing of the framework. The rear panel 79 is also preferably provided at its upper inner side with a padded roll 133, to guard against injury of the occupant, and it may also be provided with a substantially rectangular aperture 134 (Fig. 6), which occupies the major portion of the area of the panel.

The aperture 134 is closed by a hinged door or panel 135, which is mounted on the rear panel 79 by hinges 136 at the bottom. The hinged panel 135 is connected to the rear end panel 79 at its sides and upper edge by means of a fabric bellows having the two fabric sides 137 and the curved end portion 138 stitched together and secured to panels 79 and 135 by suitable upholstery nails.

This bellows extension 137, 138 is adapted to fold into the door aperture 134, within which the pocket fabric 137, 138 is secured on the inner side of the panel 79 so that the aperture 134 is left completely free of fabric when the door 135 is closed.

Bellows extension 137, 138 is adapted to serve to provide an extension of the collapsible carriage which will permit a taller occupant to lie horizontally in the carriage with his feet and legs fully extended, or the bellows extension may also be used as a storage space for merchandise, when the carriage is used on a shopping tour.

The door 135 is secured in closed position by means of a conventional cabinet latch 139 of the snap closing type, and the fabric pocket 137, 138 is prefolded or provided with suitably formed folds so that it moves into the aperture 134 when the door 135 is pivoted to closed position.

The proportions of the springs, shackles, and collapsible mechanism are such that when the mechanism is folded the springs are relieved of tension and the shackles 61 fold down against the springs, as shown in Fig. 2, but when the collapsible frame is extended or opened, the curved portions 63, 64 of the springs are drawn inward and the springs are tensioned. The springs tend, therefore, to cause a collapse of the mechanism, and the collapsible frame is preferably provided with means for holding it in open position.

This means may comprise a pair of pivoted latch bars 140 (Fig. 1), comprising flat straps of metal, such as steel, which are pivotally mounted on the lower side frame members 65, 66 by the rivets 141.

The latch bars 140 are preferably provided with extensions 160 projecting toward the right of the pivot 141 and adapted to engage stop rivets 161 carried by frame members 65 and 66. The purpose of stop members 160 and 161 is to hold latch bars 140 adjacent the latching position against the tension of springs 145. The rivet 161 is slightly spaced from the stop surface 160 when the latch bars 140 are latched.

The latch bars extend longitudinally of the frame members 65, 66 between the lever 111 and the handle extension 120, and are provided with an offset adjacent the rivet 141 so that the latch bars may be pivotally mounted on the side frame members 65, 66, but may be spaced laterally of the levers 111, which are also directly mounted on frame members 65, 66.

Each latch bar 140 is provided with a downwardly curved end portion so that the treadle rod 142, which joins these latch bars and is riveted at each end to one of them, may be spaced rearwardly of the ends of the springs 22, 23.

The extreme end 143 of each latch bar may be turned inwardly to provide protection against sharp corners. As the handle extension 120 and connecting rod 124 are disposed outwardly of the latch bars 140 and links 111 on the frame, they are provided with offsets, as indicated by the shading at 144 and 144' to prevent interference between these levers, the main parts of which are in different vertical planes.

The treadle rod 142 and latch bars 140 are urged upward in Fig. 1 by one or more, preferably two, coil springs 145, located at each side of the frame.

Coil springs 145 may have one end hooked over the treadle rod 142 and the other end hooked over the panel-supporting rod 130. In order to accomplish the latching function, each of the latching bars 140 is provided with a latching groove or shoulder 146, which may take the form of a U-shaped groove of sufficient size to receive substantially all of a stud 147, which is carried by the handle extension 120. A section of the handle extension 120 and of the latching bar 140 is shown in connection with this latching stud 147 in Fig. 7.

The latching stud 147 comprises a headed cylindrical member provided with an annular shoulder 148 and with a reduced cylindrical portion 149 that is riveted into the handle extension 120. Similar latching studs are preferably provided on both sides of the frame on the handle extensions so that the tendency toward collapsing of the vehicle, due to its weight and due to the action of the springs 22, 23, is resisted at both sides of the frame.

Preliminary to collapse of the carriage, the rear end panel 79 should have its hooks 110 lifted off the rod 130, and the panel may be dropped without support or may be supported on its uppermost hooks 109.

The operation of the collapsible mechanism is as follows:

The mechanism may be collapsed from the open position of Fig. 1 merely by placing the foot upon the treadle rod 142 and pushing downward. This is the most desirable manner of actuating such a member, as it may be done with the bottom of the sole of the shoe, so that there will be no damage to the shoe, as might be the case with levers which had to be pushed upward.

The same is true of the brake lever 56 and brake release lever 50, which are also both actuated by a downward push.

To collapse the framework, a downward push on the treadle bar 142 will move the latching groove out of engagement with the latching stud 147. Strictly speaking, it is the left hand side of the latching groove 146 (Fig. 1) which prevents the pivotal movement of the handle 117 on its pivot 127. The remainder of the groove 146 resists the tension of springs 145. The handle 117 will then be moved in a clockwise direction on the pivot 127 by reason of the pull of the link 115 in a clockwise direction, which is caused by the action of lever 111 and the pull on shackle 61, due to the springs 22, 23.

The weight of the collapsible framework and basket also tends to cause this collapsing action and to impel the handle over from the position of Fig. 1 to that of Fig. 2. As the handle moves in this direction, the handle moves clockwise, its initial movement exerting a pull on connecting rods 124, which causes the struts 92, 93 and 90, 91 to buckle or pivot at the points 100 and 95, toward the left in Fig. 1.

Both sets of struts must fold at the same time, and the uppermost struts 92 and 90 are compelled to fold forward by the diagonally extending connecting link 97, which acts in the manner of a radius rod in combination with the wooden upper frame member 69.

It should be noted that while the radius rod 97 is connected only to strut 92, the strut 90 is connected to strut 92 by means of the upper frame, 69, and must fold in a similar manner. The folding of the struts 92, 93 and 90, 91 causes the upper frame members 69, 76 and 77 to approach the lower frame members 65, 66.

The collapse of the framework of the carriage also causes a clockwise movement of the lever 111 and a counterclockwise movement of the lower extension of the strut 91. This permits the shackles 51 to fold down against the curved portions 63, 64 of the springs, and this movement is also assisted by the weight of the upper portions of the carriage.

The carriage may be unfolded merely by grasping one of the tubular legs of the handle 117 with the right hand, for example, and resting the elbow on the transverse yoke of the handle so as to apply a positive rotative force to the handle in a counterclockwise direction in Fig. 1.

When the handle reaches the position of Fig. 1, the latching bars 140 will spring into place and hold the carriage in open position. Thereafter the rear end panel 79 may be moved to the position of Fig. 1, if it is desired to have the bottom of the basket horizontal, or it may be moved to the position of Fig. 5 if it is desired to lower the foot rest 85 to use the carriage as a stroller.

There is another intermediate position that may be utilized by placing the lower hooks 110 on the shackle rod 113.

It should also be noted that the rear end panel 79 may be utilized as the back of the carriage, providing for the back support of the occupant, while the cloth covered panel 85 is utilized as a seat. The carriage is also large enough to be utilized for twins, with one occupant facing the other, at each end of the carriage.

It will thus be observed that I have invented an improved collapsible carriage which is provided with a novel springing mechanism whereby a floating springing action is secured and a much softer spring action is secured by means of the present shackle arrangement, with the use of relatively stiff springs, on account of the relation between the shackles, the frame, and the springs.

The springs of the vehicle are also utilized for urging the collapsible mechanism to folded position, and the present vehicle, while spacious and comfortable in its extended position, may also be collapsed into a very small space because of the improved arrangement of its mechanism and springs.

The rear end panel is adjustable so that the carriage may be utilized either as a bed or a stroller, and the extensible foot bellows provides for additional foot length or for storage of merchandise.

The new brake mechanism is positive and capable of ready application and release, as the controlling levers are arranged well to the rear of the vehicle, away from the rear axle, so that it is not necessary to step back and look under the vehicle to find these brake-controlling levers.

The vehicle may be collapsed very quickly into a minimum amount of space and may be unfolded with equal facility and speed. There is no possibility of bending of the axles by the brake mechanism, as the brake mechanism is actuated by a separate, strong, transversely extending frame, capable of withstanding the forces that are applied to the brake beam.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States is:

1. In a collapsible baby carriage, the combination of upper and lower frames with collapsible mechanism for connecting said frames, said collapsible mechanism being provided with depending levers, a supporting chassis including a plurality of wheels and having laterally and upwardly extending springs, and spring shackles connecting said springs and depending levers, said springs being tensioned by means of said shackles and levers when said collapsible mechanism is extended.

2. In a collapsible baby carriage, the combination of upper and lower frames with collapsible mechanism for connecting said frames, said collapsible mechanism being provided with depending levers, a supporting chassis including a plurality of wheels and having laterally and upwardly extending springs, and spring shackles connecting said springs and depending levers, said depending levers and shackles being arranged to fold the shackles downward against the springs when the collapsible mechanism is folded.

3. In a collapsible baby carriage, the combination of upper and lower frames with collapsible mechanism for connecting said frames, said collapsible mechanism being provided with depending levers, a supporting chassis including a plurality of wheels and having laterally and upwardly extending springs, and spring shackles connecting said springs and depending levers, said springs being tensioned by means of said shackles and levers when said collapsible mechanism is extended, said collapsible mechanism comprising two pairs of links having pivotal points located at similar points, said pairs being pivoted together and pivoted to the upper and lower frames, means for connecting the points of said links where they are pivoted together to move simultaneously in the same direction, and means connected to a handle and to one of said pairs of links for effecting a folding of the collapsible mechanism when the handle is moved in a predetermined direction.

4. In a collapsible baby carriage, the combination of upper and lower frames with collapsible mechanism for connecting said frames, said collapsible mechanism being provided with depending levers, a supporting chassis including a plurality of wheels and having laterally and upwardly extending springs, and spring shackles connecting said springs and depending levers, said springs being tensioned by means of said shackles and levers when said collapsible mechanism is extended, said collapsible mechanism comprising two pairs of links having pivotal points located at similar points, said pairs being pivoted together and pivoted to the upper and lower frames, means for connecting the points of said links where they are pivoted together to move simultaneously in the same direction, means connected to a handle and to one of said pairs of links for effecting a folding of the collapsible mechanism when the handle is moved in a predetermined direction, latching means on each side of the lower frame for holding the framework in extended position, and a transverse bar connecting said latching means, whereby they may be simultaneously actuated by engagement with the bar.

5. In a collapsible baby carriage, the combination of upper and lower frames with collapsible mechanism for connecting said frames, said collapsible mechanism being provided with depending levers, a supporting chassis including a plurality of wheels and having laterally and upwardly extending springs, and spring shackles connecting said springs and depending levers, said springs being tensioned by means of said shackles and levers when said collapsible mechanism is extended, said upper frame including a substantially U-shaped frame member and a pair of longitudinally extending upper rails pivoted thereto, and a basket suspended from said rails and U-shaped frame member, said basket having a rigid end member secured to said rails.

6. In a collapsible baby carriage, the combination of upper and lower frames with collapsible mechanism for connecting said frames, said collapsible mechanism being provided with depending levers, a supporting chassis including a plurality of wheels and having laterally and upwardly extending springs, and spring shackles connecting said springs and depending levers, said springs being tensioned by means of said shackles and levers when said collapsible mechanism is extended, said upper frame including a substantially U-shaped frame member and a pair of longitudinally extending upper rails pivoted thereto, and a basket suspended from said rails and U-shaped frame member, said basket having a rigid end member secured to said rails, said rigid end member having a pair of downwardly open hooks and a transverse frame member carried by the lower frame member and supporting said hooks to provide a support for said rigid end member.

7. In a collapsible baby carriage, the combination of upper and lower frames with collapsible mechanism for connecting said frames, said collapsible mechanism being provided with depending levers, a supporting chassis including a plurality of wheels and having laterally and upwardly extending springs, and spring shackles connecting said springs and depending levers, said springs being tensioned by means of said shackles and levers when said collapsible mechanism is extended, said upper frame including a substantially U-shaped frame member and a pair of longitudinally extending upper rails pivoted thereto, and a basket suspended from said rails and U-shaped frame member, said basket having a rigid end member secured to said rails, said rigid end member having a pair of downwardly open hooks and a transverse frame member carried by the lower frame member and supporting said hooks to provide a support for said rigid end member, said rails being pivotally secured to said rigid end member, and said rigid end member having another pair of said hooks, the hooks being located at different elevations, whereby the rigid end member may be supported with the bottom of the basket in horizontal position or the bottom adjacent said rigid member in position for a foot well.

ABRAHAM G. FELDMAN.